(12) United States Patent
Iida

(10) Patent No.: US 8,485,299 B2
(45) Date of Patent: Jul. 16, 2013

(54) MOTORCYCLE

(71) Applicant: Kazuhiro Iida, Shizuoka-Ken (JP)

(72) Inventor: Kazuhiro Iida, Shizuoka-Ken (JP)

(73) Assignee: Suzuki Motor Corporation, Hamamatsu-Shi (JP)

( * ) Notice: Subject to any disclaimer, the term of this patent is extended or adjusted under 35 U.S.C. 154(b) by 0 days.

(21) Appl. No.: 13/629,698

(22) Filed: Sep. 28, 2012

(65) Prior Publication Data

US 2013/0075179 A1    Mar. 28, 2013

(30) Foreign Application Priority Data

Sep. 28, 2011   (JP) ................................. 2011-213238

(51) Int. Cl.
   *B62D 61/02*   (2006.01)
   *B60K 6/32*    (2007.10)

(52) U.S. Cl.
   USPC .... 180/219; 180/65.1; 180/65.31; 180/65.21; 280/833; 280/835

(58) Field of Classification Search
   USPC ........... 180/219, 65.1, 65.31, 65.21; 280/833, 280/835
   See application file for complete search history.

(56) References Cited

U.S. PATENT DOCUMENTS

| 7,108,027 | B2 * | 9/2006 | Horii ........................... 141/311 A |
| 7,699,127 | B2 * | 4/2010 | Horii et al. .................... 180/65.1 |
| 7,885,783 | B2 * | 2/2011 | Kurosawa ...................... 702/138 |
| 2006/0278452 | A1 * | 12/2006 | Shimizu et al. ............... 180/68.3 |
| 2010/0196772 | A1 * | 8/2010 | Kasuya et al. ................ 429/429 |
| 2010/0219066 | A1 * | 9/2010 | Takeuchi et al. .............. 204/242 |

FOREIGN PATENT DOCUMENTS

JP    2009078622    4/2009

* cited by examiner

*Primary Examiner* — Tashiana Adams
*Assistant Examiner* — Marlon Arce
(74) *Attorney, Agent, or Firm* — Barnes & Thornburg LLP

(57) ABSTRACT

A motorcycle includes a fuel tank that stores fuel, a fuel filling joint hydraulically connected to the fuel tank, a first pressure reducing valve hydraulically connected to the fuel tank to reduce pressure of the fuel to first pressure, a second pressure reducing valve hydraulically connected to the first pressure reducing valve to reduce the pressure of the fuel to second pressure, a fuel cell unit hydraulically connected to the second pressure reducing valve to generate electric power via reaction of the fuel and an oxidizing agent, a high-pressure side structure that supports the fuel tank, the joint, and the first pressure reducing valve while keeping relative arrangement thereof, a low-pressure side structure that supports the second pressure reducing valve and the fuel cell unit while keeping relative arrangement thereof, and a main structure that detachably fixes the high-pressure side structure and the low-pressure side structure.

7 Claims, 14 Drawing Sheets

MOTORCYCLE

PRIORITY CLAIM

This patent application claims priority to Japanese Patent Application No. 2011-213238, filed 28 Sep. 2011, the disclosure of which is incorporated herein by reference in its entirety.

BACKGROUND OF THE INVENTION

1. Field of the Invention

The present invention relates to a motorcycle.

2. Description of the Related Art

There is known a motorcycle that is driven and traveled by driving a motor with electric power generated by a fuel cell unit. The motorcycle includes a hydrogen tank that stores a hydrogen gas, a fuel filling joint for filling the hydrogen gas in the hydrogen tank, a plurality of pressure reducing valves connected to the hydrogen tank, and a fuel cell unit that generates electric power via a reaction of the hydrogen gas and oxygen gas in air. The motorcycle includes a frame that fixes devices such as the hydrogen tank, the fuel filling joint, the plurality of pressure reducing valves, and the fuel cell unit and a relay pipe that hydraulically connects the devices (see, for example, Patent Document 1 (Japanese Patent Laid-Open No. 2009-078622)).

As a procedure for attaching and fixing the devices such as the hydraulic tank, the fuel filling joint, the plurality of pressure reducing valves, and the fuel cell unit, there is a procedure for first hydraulically connecting the devices using the relay pipe and then attaching and fixing the devices to the frame while keeping the hydraulic connection of the devices and the relay pipe (hereinafter referred to as "pipe-connection-first procedure"). There is also a procedure for first attaching and fixing the devices to the frame and then hydraulically connecting the devices using the relay pipe (hereinafter referred to as "frame-attachment-first procedure"). In both procedures, a channel for leading the hydrogen gas from the hydrogen tank to the fuel cell unit needs to undergo a leak inspection for applying normal pressure to the channel to guarantee air tightness for each of connected portions.

However, in the pipe-connection-first procedure, the devices such as the hydrogen tank, the joint, the plurality of pressure reducing valves, and the fuel cell unit need to be collectively attached to the frame. Therefore, it is difficult to keep a relative positional relation among the devices. It is highly likely that a change in the relative positional relation occurs. The change in the relative positional relation among the devices damages the relay pipe and joint portions of the relay pipe and the devices and causes a leak.

In the frame-attachment-first procedure, naturally, the leak inspection is performed in a state in which the devices such as the hydrogen tank, the joint, the plurality of pressure reducing valves, the fuel cell, and the relay pipe are attached to the frame. Therefore, weight of an inspection target increases and easiness of handling is deteriorated. When the frame is located in a vicinity of the joint portions of relay pipes and the devices, workability of the leak inspection is deteriorated. Further, reliability of the inspection is likely to be deteriorated. Moreover, the deterioration in the easiness of handling and the workability of the inspection is inappropriate for a line production system.

SUMMARY OF THE INVENTION

Therefore, the present invention proposes a motorcycle in which a series of devices for leading fuel from a fuel storage tank to a fuel cell unit are easily assembled, workability of a leak inspection for a channel that hydraulically connects the devices is high, and handling in assembly work and the inspection is easy.

In order to solve the problems, a motorcycle according to the present invention includes: a fuel tank that stores fuel; a fuel filling joint hydraulically connected to the fuel tank; a first pressure reducing valve hydraulically connected to the fuel tank to reduce pressure of the fuel to first pressure; a second pressure reducing valve hydraulically connected to the first pressure reducing valve to reduce the pressure of the fuel to second pressure; a fuel cell unit hydraulically connected to the second pressure reducing valve to generate electric power via reaction of the fuel and an oxidizing agent; a high-pressure side structure that supports the fuel tank, the joint, and the first pressure reducing valve while keeping relative arrangement thereof; a low-pressure side structure that supports the second pressure reducing valve and the fuel cell unit while keeping relative arrangement thereof; and a main structure that detachably fixes the high-pressure side structure and the low-pressure side structure.

According to the present invention, a motorcycle is provided in which a series of devices for leading fuel from a fuel storage tank to a fuel cell are easily assembled, workability of a leak inspection for a channel that hydraulically connects the devices is high, and handling in assembly work and the inspection is easy.

The nature and further characteristic features of the present invention will be made clearer from the following descriptions made with reference to the accompanying drawings.

DESCRIPTION OF THE PREFERRED EMBODIMENT

A motor for vehicle driving according to an embodiment of the present invention is described hereunder with reference to FIGS. 1 to 14. It is to be noted that terms such as "upper", "lower", "right", "left" and the like terms indicating direction are used herein with reference to the illustrations of the drawings or in an normal standing state of the motorcycle such as shown in FIG. 1

Figure 1:
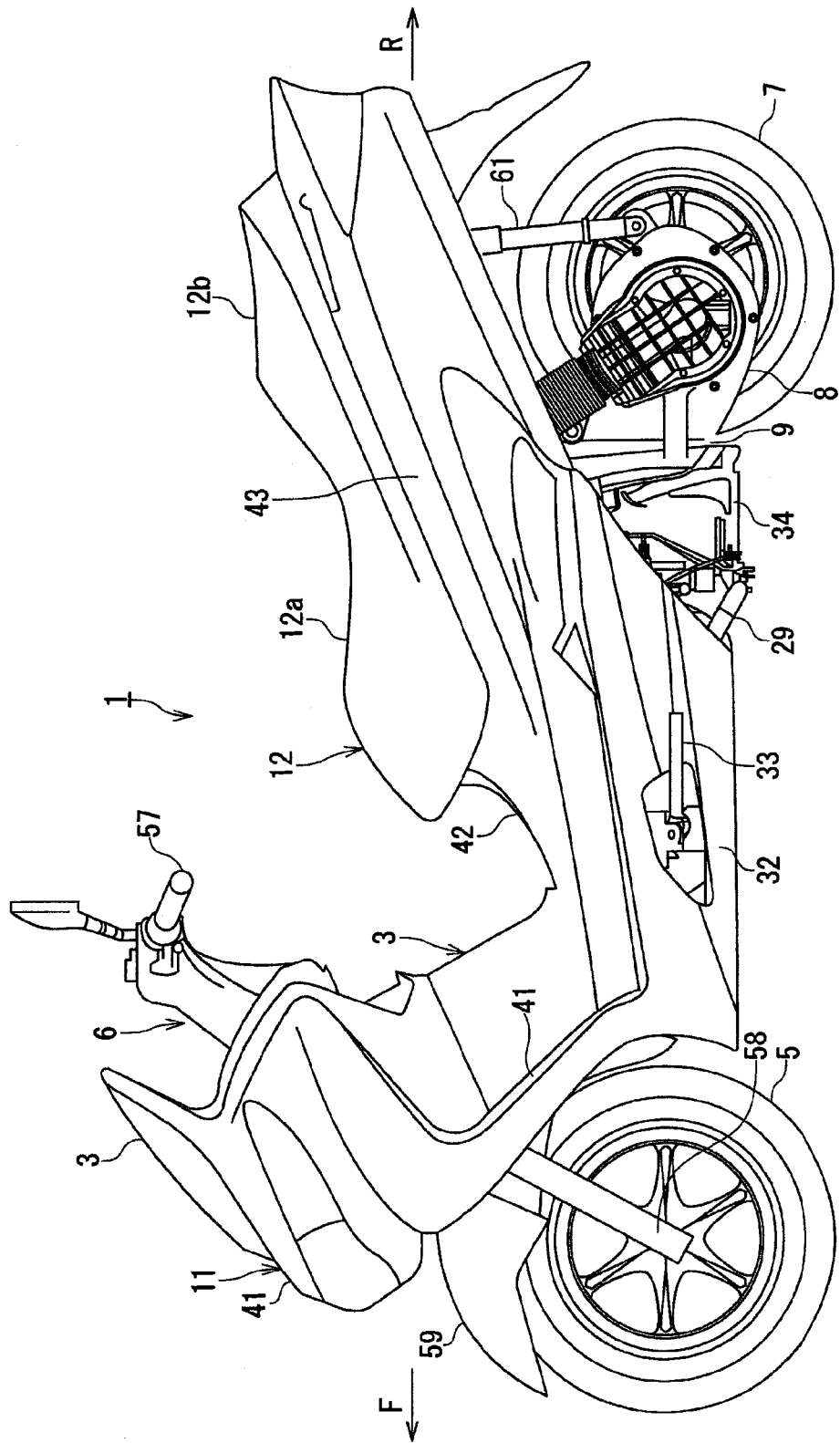
FIG. 1 is a left side view showing a motorcycle according to an embodiment of the present invention.
Figure 2:
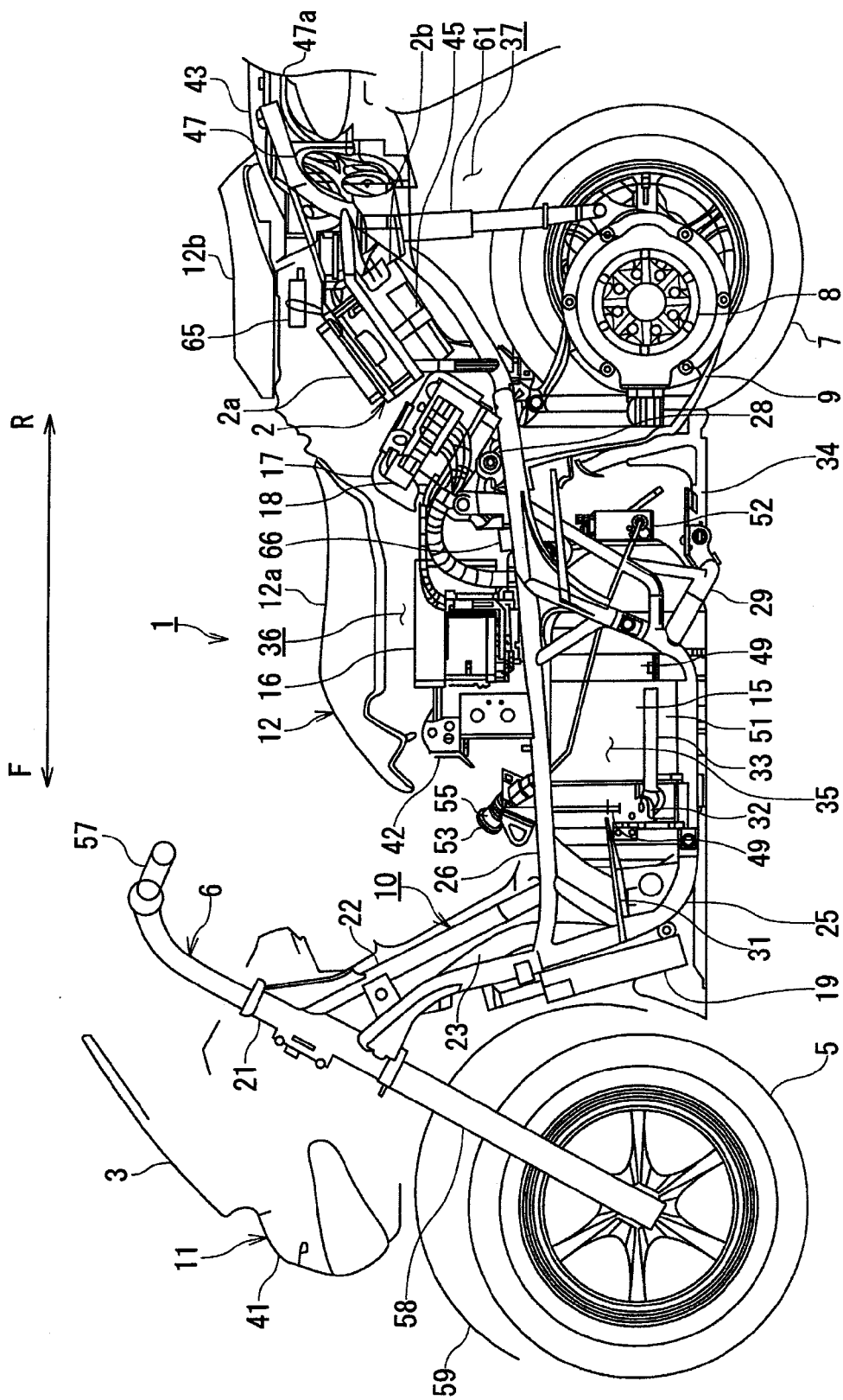
FIG. 2 is a left side view showing the motorcycle according to the embodiment.
Figure 3:
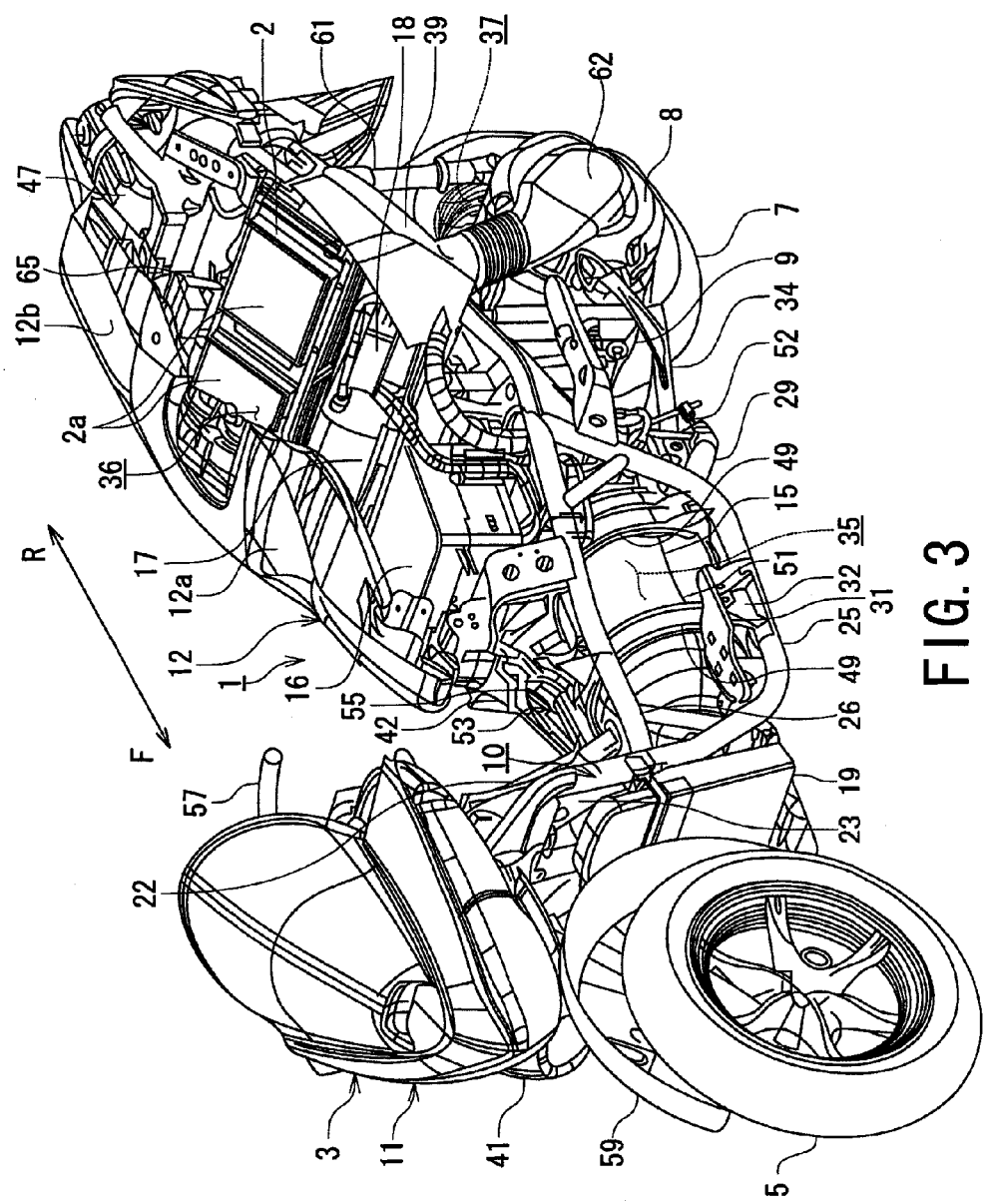
FIG. 3 is a perspective view showing the motorcycle according to the embodiment.

In FIG. 1, an outer appearance of a motorcycle 1 is shown, and in FIGS. 2 and 3, an internal structure of the motorcycle 1 is shown with a body cover (i.e., exterior cover or armor) of the motorcycle 1 partially cut away or removed.

To facilitate explanation, a front side (forward direction) of the motorcycle 1 is indicated by a solid line arrow F and a rear side (rearward direction) of the motorcycle 1 is indicated by a solid line arrow R.

Figure 4:
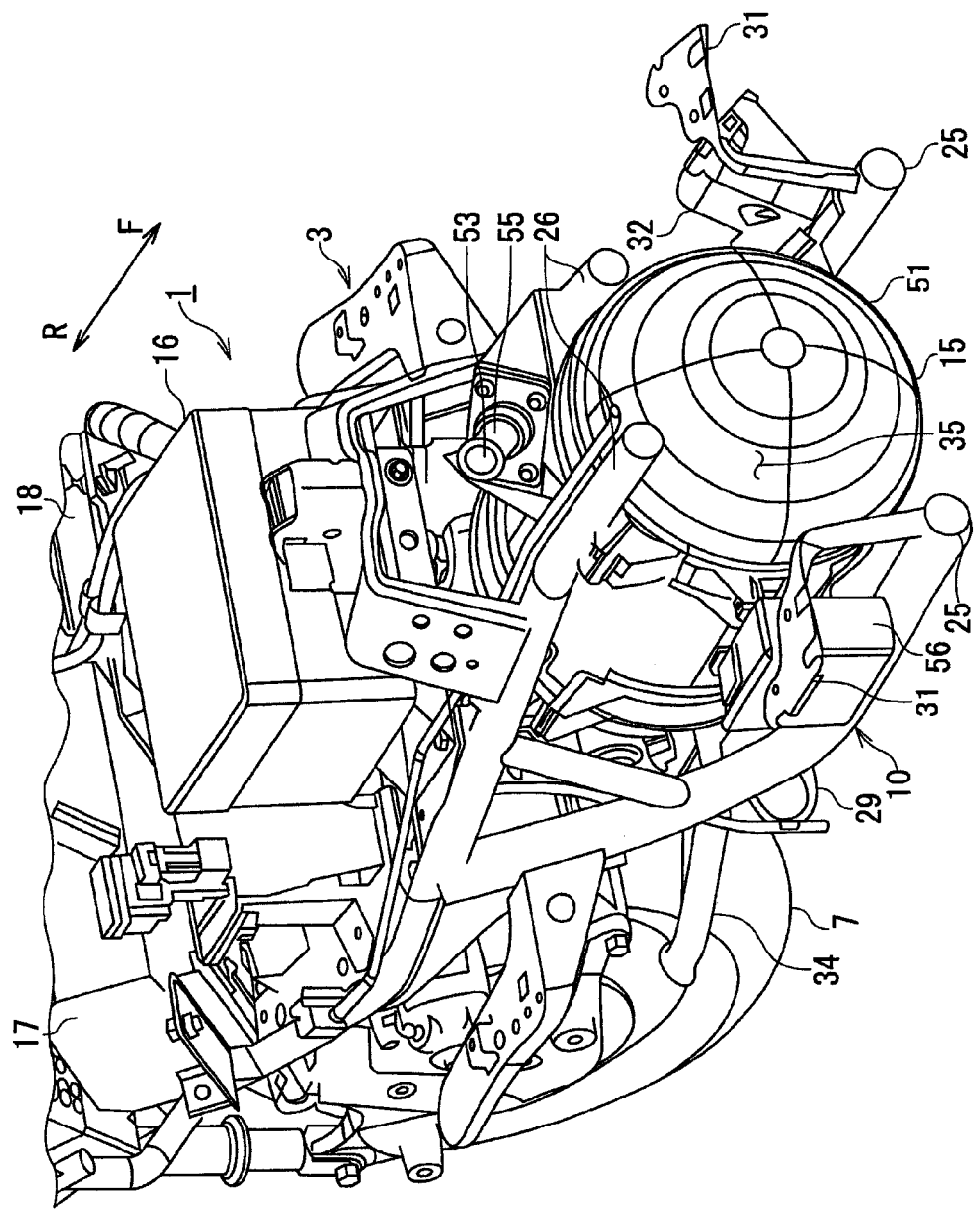
FIG. 4 is a perspective view partially showing a rear half section of the motorcycle according to the embodiment.

FIG. 4 is a perspective view partially showing a rear half section of the motorcycle according to the embodiment of the present invention.

As shown in FIGS. 1 to 4, the motorcycle 1 according to this embodiment is a fuel-cell motorcycle that is driven and traveled by driving a motor 8 with electric power generated by a fuel cell unit 2. The motorcycle 1 is a motorcycle of a scooter type. The motorcycle 1 includes a vehicle body 3 that extends to the front and the rear of the motorcycle 1, a front wheel 5 as a steering wheel, a steering mechanism 6 that supports the front wheel 5 to be steered, a rear wheel 7 as a driving wheel, a motor 8 that drives the rear wheel 7, and a swing arm 9 that supports the rear wheel 7.

The fuel cell unit 2 generates electric power via reaction of fuel as a reducing agent and an oxidizing agent. The fuel cell unit 2 is an air-cooled fuel cell system that uses a hydrogen gas as the fuel and uses oxygen in air as the oxidizing agent.

The vehicle body 3 includes a frame 10 that extends to the front and the rear of the motorcycle 1, an external cover 11 that covers the frame 10, and a seat 12 located above a rear half section of the frame 10.

The vehicle body 3 includes the fuel cell unit 2 that generates electric power with the fuel, a fuel tank 15 that stores the fuel used for the power generation of the fuel cell unit 2, a secondary battery (cell) 16 that supplements the electric power of the fuel cell unit 2, a power managing device 17 that performs adjustment of an output voltage of the fuel cell unit 2 and power distribution control for the fuel cell unit 2 and the secondary battery 16, a motor controller 18 that receives direct-current power from the power managing device 17 and converts the direct-current power into three-phase alternating-current power to perform operation control for the motor 8, and a vehicle controller 19 that collectively manages these devices and performs operation control. A power train of the motorcycle 1 is a hybrid system including the fuel cell unit 2 and the secondary battery 16.

The frame 10 is a body frame assembly that is obtained by integrally combining a plurality of hollow pipes made of steel. The frame 10 includes a head pipe 21 located at a front end upper portion of the frame 10, an upper down frame 22 that extends to incline downward to the rear from a center portion of the head pipe 21, a lower down frame 23, a pair of left and right lower frames 25, a pair of left and right upper frames 26, a pivot 28, and a guard frame 29.

The head pipe 21 is located at the front end upper portion of the frame 10. The head pipe 21 supports the steering mechanism 6 to be rotatable in left and right directions of the motorcycle 1.

The upper down frame 22 is connected to the center portion of the head pipe 21. The upper down frame 22 extends to incline downward to the rear from the connected portion.

The lower down frame 23 is connected to a lower portion of the head pipe 21. The lower down frame 23 extends to incline downward to the rear from the connected portion.

The pair of left and right lower frames 25 are connected to a lower rear portion of the head pipe 21 with the lower down frame 23 held therebetween. The pair of left and right lower frames 25 extend to incline downward to the rear from the connected portion, curve with lower ends of inclining portions thereof faced to the rear, linearly extend from rear ends of curving portions thereof to a position in a center portion of the vehicle body 3 along the front and the rear of the vehicle body 3, curve upward to the rear from rear end portions of linearly extending portions thereof, and extend to incline upward to the rear from upper end portions of curving portions thereof to be connected to the upper frames 26. The pair of left and right lower frames 25 include, in the curving portions on the front side, footrests 31 for a rider to place feet. The lower frame 25 on the left side of the vehicle body 3 includes a side stand bracket 32. The side stand bracket 32 includes a side stand 33 that supports, in a self-standing state, the motorcycle 1 inclining to the left side. The side stand 33 swings between a spread position for supporting the motorcycle 1 and a retracted position for traveling.

The pair of left and right upper frames 26 are connected to a center portion of a front side inclining portion of the lower down frame 23 in a front half section of the vehicle body 3. The pair of left and right upper frames 26 extend from the connected portion to the rear side of the vehicle body 3 substantially horizontally, incline largely upward to the rear in a rear half section of the vehicle body 3 and an upper portion of the rear wheel 7, and extend to nearly the same height of the head pipe 21.

The pivot 28 is supported or suspended between the left and right upper frames 26 in the rear half section of the vehicle body 3. The pivot 28 is located further on the rear side than connected portions of the upper frames 26 and the lower frames 25.

The guard frame 29 is suspended between the curving portions located on the rear side of the lower down frame 23 on the left and right. The guard frame 29 expands downward to the rear from the connected portion to the lower down frame 23 to be formed in a U shape. The guard frame 29 includes a center stand 34 that supports the upright motorcycle 1 in a self-standing state. The center stand 34 swings between the spread position for supporting the motorcycle 1 and the retracted position for traveling.

The seat 12 is located in a rear half upper portion of the vehicle body 3. The seat 12 extends to the front and the rear while covering an upper portion in the rear half section of the frame 10. The seat 12 is a tandem type. The seat 12 integrally includes a front section 12a for the rider to sit and a rear section 12b for a passenger to sit.

A space surrounded by the left and right upper frames 26 and the left and right lower frames 25 is referred to as center tunnel region 35. A space surrounded by rear half sections of the upper frames 26, the external cover 11, and the seat 12 is referred to as equipment mounting region 36. A space behind the center tunnel region 35 and under the equipment mounting region 36 is referred to as tire house region 37.

The center tunnel region 35 houses the fuel tank 15.

The equipment mounting region 36 houses the secondary battery 16, the power managing device 17, and the fuel cell unit 2 in order from the front side of the vehicle body 3. The equipment mounting region 36 houses the motor controller 18 arranged on a left or right side of the power managing device 17, for example, a left side of the vehicle body 3.

The tire house region 37 is an arrangement place of the rear wheel 7.

A partition wall member 39 is held between the equipment mounting region 36 and the tire house region 37 to divide the regions.

The external cover 11 includes a front leg shield cover 41 that covers the front half section of the vehicle body 3, a front frame cover 42 located in a center upper portion of the vehicle body 3 to cover upper portions of the upper frames 26, and a frame cover 43 located in the rear half section of the vehicle body 3 to cover lower portions of the seat 12 on side surfaces of the vehicle body 3.

The frame cover 43 divides the equipment mounting region 36 in conjunction with the seat 12. The equipment mounting region 36 is a closed space surrounded by the seat 12, the frame cover 43, and the partition wall member 39. A ventilation hole (not shown in the figures) is arranged in an appropriate place of the frame cover 43 or the partition wall member 39, whereby a flow of the air to the fuel cell unit 2 is easily and surely controlled and, as cooling air, the flow of the air is easily and surely supplied to a device required to be cooled. The equipment mounting region 36 does not need to be a hermetically sealed space. The equipment mounting region 36 allows the air to enter from joints of the covers.

The fuel cell unit 2 is located on a rear half side of the equipment mounting region 36. More specifically, the fuel cell unit 2 is located under the rear section 12b of the seat 12 and in the portion where the upper frames 26 largely incline upward to the rear side. The fuel cell unit 2 is a flat cubic device. The fuel cell unit 2 includes an air inlet on an air intake surface 2a having a largest projection area and includes an exhaust port 2b on a surface facing the rear of the motorcycle 1. The fuel cell unit 2 is fixed to the frame 10 in forward-tilting posture with the air intake surface 2a faced front upward, more specifically, faced to a step portion between the front section 12a and the rear section 12b of the seat 12. Consequently, in the fuel cell unit 2, a relatively large space is secured between the air intake surface 2a and the seat 12 to sufficiently suck atmosphere (the air) in the equipment mounting region 36.

In order to suck the atmosphere (the air) in the equipment mounting region 36 into the air intake surface 2a, the fuel cell unit 2 includes a fan 45 that generates suction negative pressure. The fuel cell unit 2 generates electric power via a chemical reaction of the hydrogen gas supplied from the fuel tank 15 and oxygen gas included in the air. Thereafter, the fuel cell unit 2 discharges wet excess gas from the exhaust port 2b. In this process, the fuel cell unit 2 is cooled by the air. The exhaust port 2b is connected to an exhaust duct 47.

The exhaust duct 47 is located behind the fuel cell unit 2. The exhaust duct 47 leads exhaust air of the fuel cell unit 2 to an exhaust port 47a opened at a rear end of the vehicle body 3. A front lower end portion of the exhaust duct 47 is connected to the exhaust port 2b of the fuel cell unit 2. The exhaust port 47a is located above the exhaust port 2b of the fuel cell unit 2, desirably, in a rear upper end portion of the exhaust duct 47. Since the exhaust duct 47 includes the exhaust port 47a located above the exhaust port 2b of the fuel cell unit 2, the exhaust duct 47 surely exhausts wet excess gas including unreacted hydrogen gas from the vehicle body 3.

The fuel tank 15, as a pressure vessel, is a high-pressure compressed hydrogen storage system and is a composite container made of aluminum liner that stores the hydrogen gas serving as the fuel of the fuel cell unit 2. For example, the fuel tank 15 is a container that stores hydrogen gas having about 30 MPa to about 70 MPa. The fuel tank 15 is a cylindrical tank including dome-like end plates on front and rear end surfaces. The fuel tank 15 is located in the center tunnel region 35 with a center line of a cylindrical body thereof faced to a front-rear direction of the vehicle body 3.

The fuel tank 15 is fixed by a clamp band 49 suspended between the left and right lower frames 25.

A fuel supply main valve 52 is a shut-off valve including an electromagnetic valve. The fuel supply main valve 52 supplies the fuel from the fuel tank 15 to the fuel cell unit 2 and shuts off the supply of the fuel. The fuel supply main valve 52 is located at a top of the end plate on the rear side of the fuel tank 15.

A joint 55 is a joint hydraulically connected to the fuel tank 15 to fill the hydrogen gas serving as the fuel in the fuel tank 15. The joint 55 is located above a body section of the fuel tank 15. The joint 55 extends upward in the vehicle body 3. A fuel filling port 53 of the joint 55 is located on an outer side of the equipment mounting region 36, in a vicinity of the upper down frame 22, and in a vicinity above the front side end plate of the fuel tank 15 to be sufficiently separated from the secondary battery 16. The fuel filling port 53 is covered with the front frame cover 42.

The fuel filling port 53 faces upward in the vehicle body 3. When the fuel as the hydrogen gas is filled in the fuel tank 15, in a state in which the front frame cover 42 is opened, a space opened to the atmosphere is formed above the fuel filling port 53. Therefore, even if the fuel leaks in fuel filling work, the leaked fuel does not remain. Further, the fuel filling port 53 is arranged in the same manner as a fuel filler port in a motorcycle of a scooter type including a normal gasoline engine. Therefore, the fuel filling port 53 does not cause a sense of discomfort.

The secondary battery 16 is a lithium ion battery having a box shape. The secondary battery 16 is located on a front side of the equipment mounting region 36. More specifically, the secondary cell 16 is located above the rear side end plate of the fuel tank 15 and under the front section 12a of the seat 12 to stand substantially upright on an imaginary horizontal surface of the motorcycle 1.

The motorcycle 1 includes, besides the secondary battery 16, a second secondary battery 56 that supplies 12V electric power functioning as a power supply for meters (not shown in the figures) and lamps (not shown in the figures). The second secondary battery 56 is located on a side of the fuel tank 15 (e.g., a right side of the fuel tank 15). The second secondary battery 56 is located under the fuel filling port 53 and in front of the fuel supply main valve 52 of the fuel tank 15. Even if the hydrogen gas serving as the fuel leaks from the fuel filling port 53, the hydrogen gas rises upward in the motorcycle 1. Therefore, the hydrogen gas diffuses to an outside of the motorcycle 1 without remaining in the external cover 11. Even if the hydrogen gas serving as the fuel leaks from the fuel supply main valve 52, the hydrogen gas moves to the tire house region 37. Therefore, the hydrogen gas diffuses to the outside of the motorcycle 1 without remaining in the external cover 11.

The power managing device 17 is located to be held between the secondary battery 16 and the fuel cell unit 2. The power managing device 17 is a flat cubic device. The power managing device 17 tilts with a top surface faced obliquely upward to the rear and faces the fuel cell unit 2. The power managing device 17 is fixed to the frame 10.

Like the power managing device 17, the motor controller 18 arranged on the side of the power managing device 17 is located to be held between the secondary battery 16 and the fuel cell unit 2. The motor controller 18 is also a flat cubic device. The motor controller 18 tilts with a top surface faced obliquely upward to the rear and faces the fuel cell unit 2. The motor controller 18 is fixed to the frame 10.

In the motorcycle 1, the secondary cell 16, the power managing device 17, the motor controller 18, and the fuel cell unit 2 are arranged as explained above. Therefore, the devices adjacent to one another in an electrical connection relation are arranged as close as possible. As a result, wiring length among the devices is reduced and weight related to wiring is reduced.

The vehicle controller 19 is located in front of the lower frames 25 to face the front side end plate of the fuel tank 15.

The steering mechanism 6 is supported by the head pipe 21 and located in front of the vehicle body 3. The steering mechanism 6 rotates in a left-right direction around the head pipe 21 of the frame 10 to steer the front wheel 5. The steering mechanism 6 includes a handle 57 located at a top and a pair of left and right front forks 58 that substantially vertically extend between the handle 57 and the front wheel 5 while slightly tilting backward. The left and right front forks 58 include an elastically retractable telescopic structure. The left and right front forks 58 rotatably support the front wheel 5 at lower ends and support a front fender 59 above the front wheel 5.

The front wheel 5 is a driven wheel rotatable around a wheel shaft suspended at the lower ends of the left and right front forks 58.

The swing arm 9 swings in the up and down direction around the pivot 28 functioning as a rotation center that extends to the left and the right of the vehicle body 3. The swing arm 9 is a so-called cantilever type. The swing arm 9 supports the rear wheel 7 in a cantilever manner from one of the left and right sides (the left side in the figure) of the vehicle body 3. A rear suspension 61 is interposed between the frame 10 and the swing arm 9 to buffer the swing of the swing arm 9. A cooling duct 62 connects the equipment mounting region 36 and the motor 8 and leads the air in the equipment mounting region 36 as cooling air for the motor 8. The rear suspension 61 is suspended between the frame 10 and the swing arm 9 to interfere with the swing of the swing arm 9.

The rear wheel 7 is a driving wheel rotatable around a wheel shaft, which extends in a cantilever manner from one of the left and right sides (the left side in the figure) of the vehicle body 3, at a rear end portion of the swing arm 9.

The motor 8 is a motor of the motorcycle 1 that drives the rear wheel 7 with an output of the fuel cell unit 2. The motor 8 is integrally assembled with the swing arm 9 to configure a swing arm of a unit swing type.

The vehicle body 3 includes fuel leak detectors 65 and 66 that detect a leak of the fuel. Specifically, the fuel leak detectors 65 and 66 are hydrogen gas detectors that detect the hydrogen gas. The fuel leak detector 65 is arranged in the equipment mounting region 36, i.e., close to an upper portion in a space under the seat 12. The fuel leak detector 66 is present in a position close to an upper portion of a space in a vicinity of the fuel supply main valve 52 in the center tunnel region 35 and close to the tire house region 37. The hydrogen gas is lighter than the air, which is the atmosphere in the equipment mounting region 36 and the center tunnel region 35. Therefore, the fuel leaking from the fuel cell unit 2, the fuel tank 15, and the relay pipe that connects the fuel tank 15 and the fuel cell unit 2 is easily detected. In particular, since the equipment mounting region 36 is a closed space, when the fuel leaks from the fuel cell unit 2 or a piping system (not shown in the figures) in a vicinity of the fuel cell unit 2, the fuel leak detector 65 quickly detects the leaking fuel. The fuel leak detector 66 surely detects the leaking fuel even under a situation in which the fuel leaks from a vicinity of the fuel supply main valve 52 of the fuel tank 15 and the leaking fuel easily flows out to the tire house region 37 because of traveling wind or the like.

Figure 5:
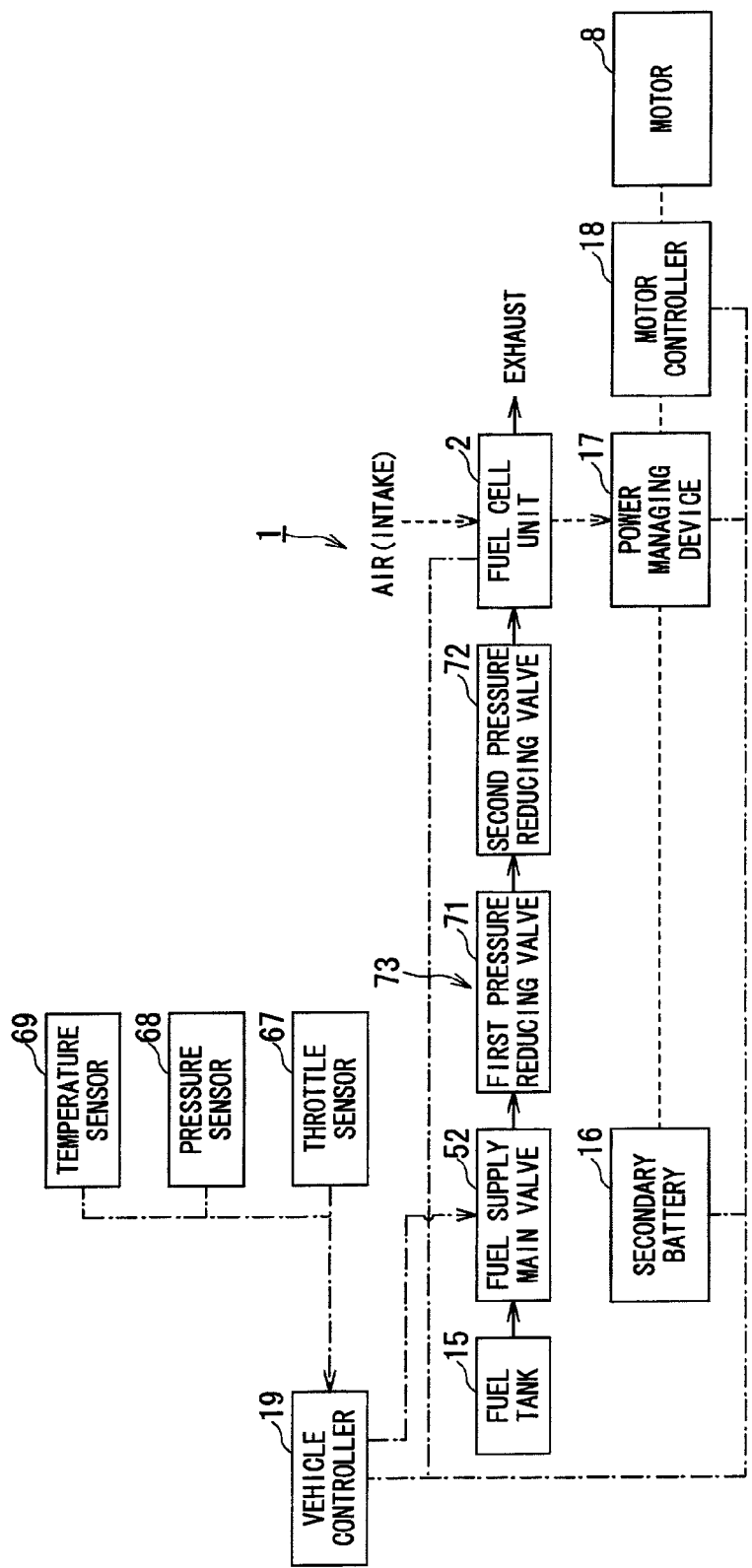
FIG. 5 is a block diagram showing main devices of a fuel-cell motorcycle, which is an example of a fuel-cell vehicle according to the embodiment of the present invention.

FIG. 5 is a block diagram showing main devices of a fuel cell unit motorcycle, which is an example of a fuel cell unit vehicle according to the embodiment of the present invention.

As shown in FIG. 5, in addition to the fuel cell unit 2, the motor 8, the fuel tank 15, the secondary battery 16, the power managing device 17, the motor controller 18, and the vehicle controller 19, the motorcycle 1 according to this embodiment includes a throttle sensor 67 that performs detection of operation for acceleration and deceleration by the rider and measurement of an operation amount, a pressure sensor 68 that detects pressure of the fuel flowing from the fuel tank 15 to the fuel cell unit 2, a fuel temperature sensor 69 that detects temperature of the fuel flowing from the fuel tank 15 to the fuel cell unit 2, the fuel supply main valve 52 that shut off, when a fuel leak occurs, the fuel supplied from the fuel tank 15 to the fuel cell unit 2, a first pressure reducing valve 71 hydraulically connected to the fuel tank 15 to reduce pressure of the fuel to first pressure, and a second pressure reducing valve 72 hydraulically connected to the first pressure reducing valve 71 to reduce the pressure of the fuel to second pressure. In FIG. 5, a solid line arrow indicates a flow of the hydrogen gas serving as the fuel and the air, a broken line or a broken line arrow indicates a flow of electric power, and an alternate long and short dash line or an alternate long and short dash line arrow indicates a flow of a control signal. A line segment without an arrow indicates flows in both directions.

The power managing device 17 controls generated electric power of the fuel cell unit 2, converts electric power sent from the fuel cell unit 2 and the secondary battery 16 into 12V power, and accumulates the electric power in the second secondary battery 56.

The motor controller 18 performs, in addition to the driving control of the motor 8, regeneration control for converting negative torque generated in the motor 8 during deceleration of the motorcycle 1 or during traveling on a downhill road into electric power.

The vehicle controller 19 reads an accelerator operation amount detected by the throttle sensor 67 and detection values of the pressure sensor 68 and the fuel temperature sensor 69, bidirectionally performs reading of state amounts and output of control signals between the vehicle controller 19 and the fuel cell unit 2, the secondary cell 16, the power managing device 17, and the motor controller 18, and performs operation control for the motorcycle 1.

Specifically, during cruising or during traveling on a flat road when energy necessary for traveling of the motorcycle 1 is relatively small, the vehicle controller 19 supplies electric power generated by the fuel cell unit 2 from the power managing device 17 to the motor 8 through the motor controller 18, supplies the electric power from the power managing device 17 to the secondary battery 16, and accumulates excess electric power unnecessary for driving of the motor 8 in the secondary battery 16.

On the other hand, during acceleration or during traveling on an uphill road when energy necessary for traveling of the motorcycle 1 is relatively large, the vehicle controller 19 supplies electric power generated by the fuel cell unit 2 from the power managing device 17 to the motor 8 through the motor controller 18 and supplies electric power accumulated in the secondary cell 16 from the power managing device 17 to the motor 8 through the motor controller 18.

Further, during the deceleration or during the traveling on a downhill road, the vehicle controller 19 uses the motor 8 as a generator, supplies regenerative electric power generated by the motor 8 from the power managing device 17 to the secondary cell 16, and accumulates the regenerative electric power in the secondary cell 16.

A supply path for the fuel extending from the fuel tank 15 to the fuel cell unit 2 through the fuel supply main valve 52, the first pressure reducing valve 71, and the second pressure reducing valve 72 is referred to as fuel supply system 73.

The first pressure reducing valve 71 sets pressure of the fuel tank 15 as primary side pressure, reduces the primary side pressure to the first pressure, and sends the first pressure to the second pressure reducing valve 72.

The second pressure reducing valve 72 reduces secondary side pressure (i.e., the first pressure) of the first pressure reducing valve 71 to the second pressure and sends the second pressure to the fuel cell unit 2.

The pressure of the fuel tank 15, i.e., the primary side pressure of the first pressure reducing valve 71 indicates, for example, a high-pressure gas in a High Pressure Gas Safety Act. The pressure at normal temperature is equal to or higher than 1 MPa and is specifically about 70 MPa. The secondary side pressure (i.e., the first pressure) of the first pressure reducing valve 71 is desirably lower than 1 MPa at the normal temperature and is specifically set to about 2 MPa. Further, the secondary side pressure (i.e., the second pressure) of the second pressure reducing valve 72 is lower than the first pressure. The pressure at the normal temperature is desirably lower than 1 MPa and is specifically set to about 0.4 MPa.

The frame 10, the fuel cell unit 2, and the fuel supply system 73 will be explained hereunder in detail.

Figure 6:
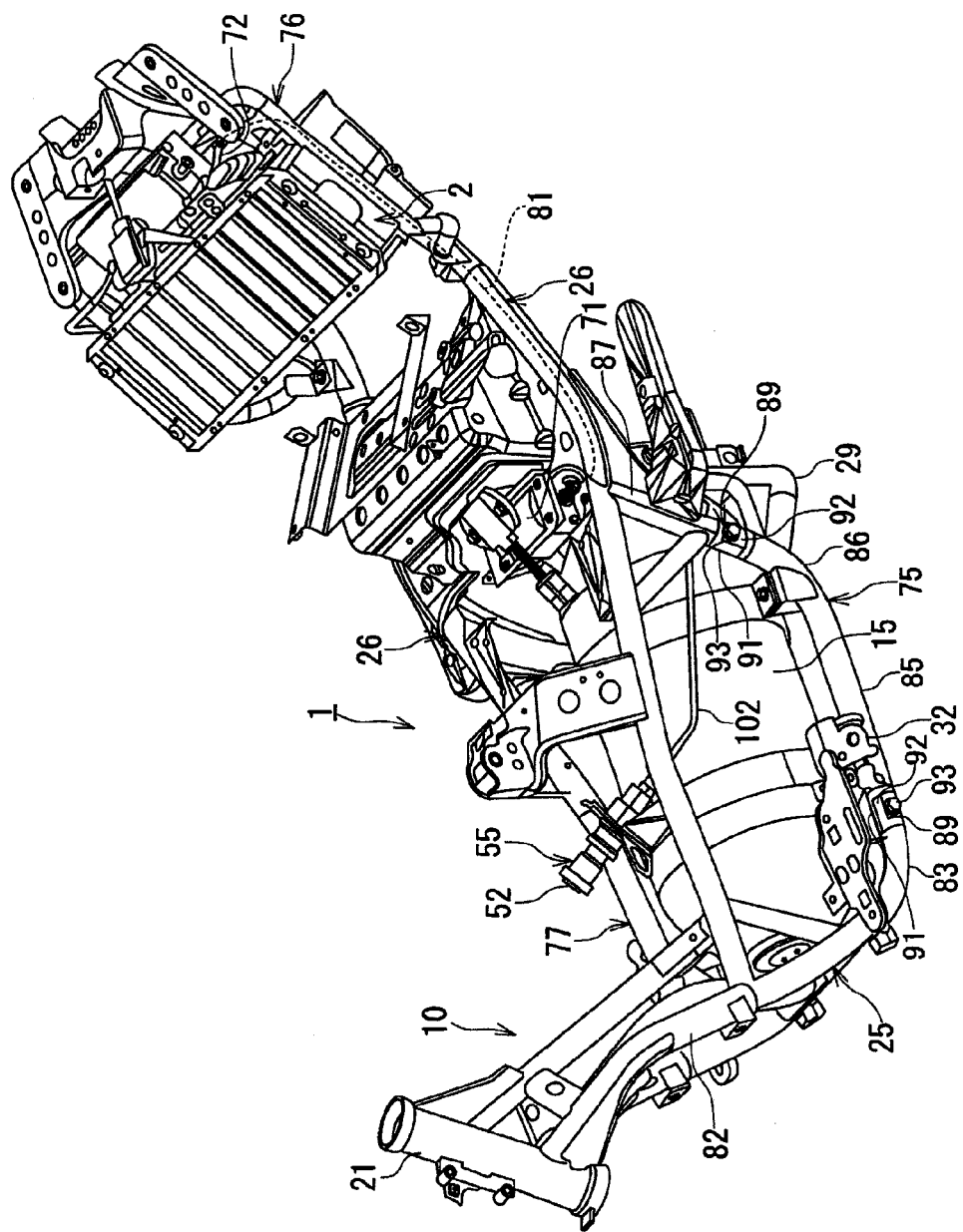
FIG. 6 is a perspective view showing a frame, a fuel cell unit, and a fuel supply system of the motorcycle according to the embodiment.

FIG. 6 is a perspective view showing the frame, the fuel cell unit, and the fuel supply system of the motorcycle 1 according to the embodiment of the present invention.

Figure 7:
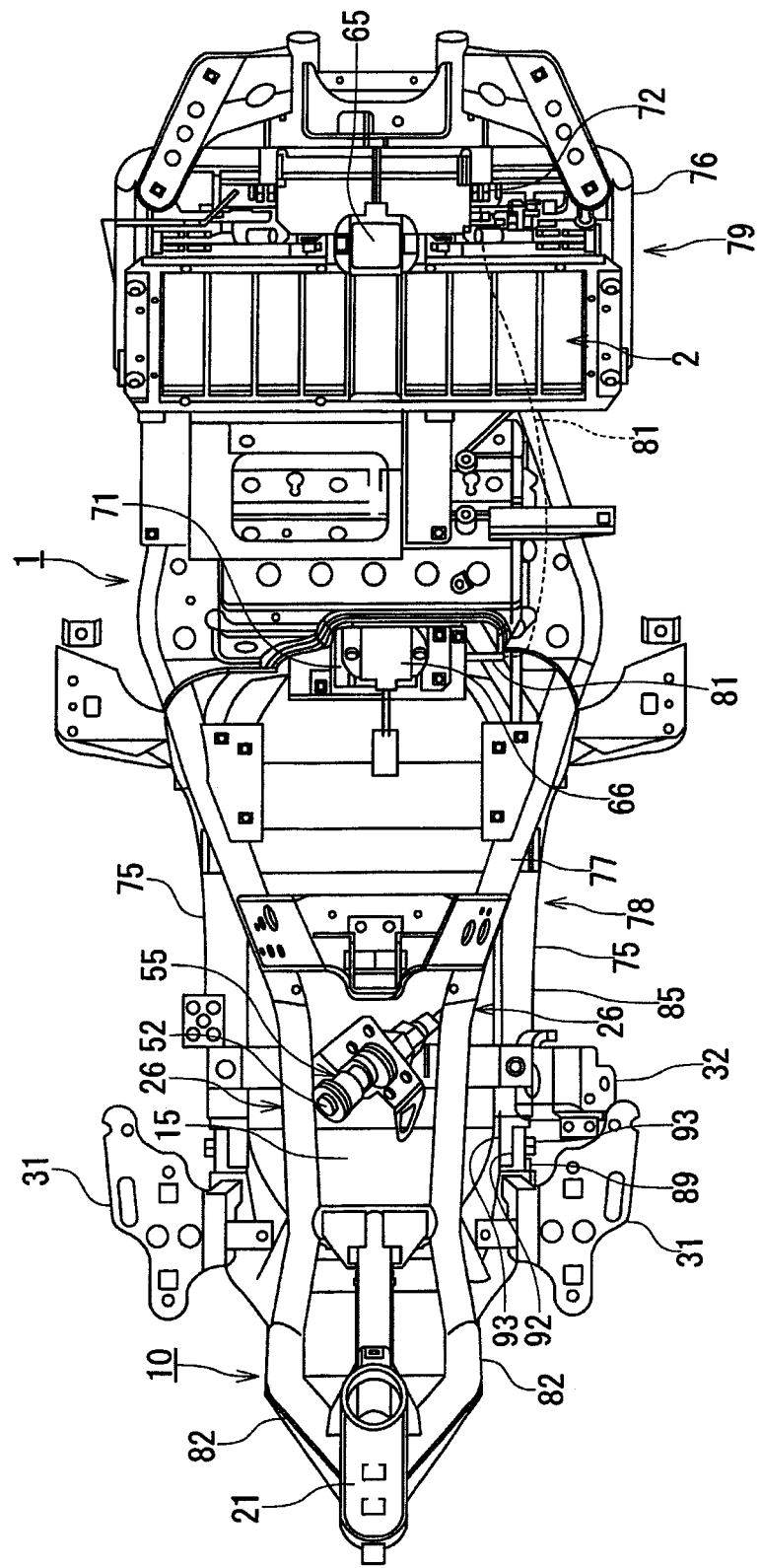
FIG. 7 is a plan view showing the frame, the fuel cell unit, and the fuel supply system according to the embodiment.

FIG. 7 is a plan view showing the frame, the fuel cell unit 2, and the fuel supply system 73 of the motorcycle 1 according to the embodiment of the present invention.

As shown in FIGS. 6 and 7, the motorcycle 1 includes the fuel tank 15 that store the fuel, the fuel filling joint 55 hydraulically connected to the fuel tank 15, the first pressure reducing valve 71 hydraulically connected to the fuel tank 15 to reduce pressure of the fuel to the first pressure, the second pressure reducing valve 72 hydraulically connected to the first pressure reducing valve 71 to reduce the pressure of the fuel to the second pressure, the fuel cell unit 2 hydraulically connected to the second pressure reducing valve 72 to generate electric power via a reaction of the fuel and an oxidizing agent, a high-pressure side structure 75 that supports the fuel tank 15, the joint 55, and the first pressure reducing valve 71 while keeping relative arrangement thereof, a low-pressure side structure 76 that supports the second pressure reducing valve 72 and the fuel cell unit 2 while keeping relative arrangement thereof, and a main structure 77 that detachably fixes the high-pressure side structure 75 and the low-pressure side structure 76.

The fuel cell unit 2 is a wide rectangular parallelepiped device having a width dimension larger than a separation distance between the left and right upper frames 26 in a mounting place of the fuel cell unit 2.

At least a portion of the first pressure reducing valve 71 is arranged between the left and right upper frames 26.

In the motorcycle 1, the fuel tank 15, the joint 55, and the first pressure reducing valve 71 are fixed to the high-pressure side structure 75 to configure a high-pressure side module 78. The second pressure reducing valve 72 and the fuel cell unit 2 are fixed to the low-pressure side structure 76 to configure a low-pressure side module 79. The respective modules 78 and 79 are individually handled and attached to and detached from the frame 10. A first relay pipe 81 that hydraulically connects the first pressure reducing valve 71 and the second pressure reducing valve 72 is connected after the respective modules 78 and 79 is fixed to the frame 10.

First, the frame 10 is explained in detail hereunder with reference to FIG. 6.

The respective left and right lower frames 25 include front inclining sections 82, front curving sections 83, lower horizontal sections 85, rear curving sections 86, and rear inclining sections 87 that are linked in order from a front side connected to the head pipe 21. The front inclining sections 82 extend to incline downward to the rear from connected portions to the head pipe 21. The front curving sections 83 are linked to lower ends of the front inclining sections 82 to curve backward. The lower horizontal sections 85 are linked to rear ends of the front curving sections 83 to extend backward substantially horizontally. The rear curving sections 86 are linked to rear ends of the lower horizontal sections 85 to curve obliquely upward to the rear. The rear inclining sections 87 are linked to upper ends of the rear curving sections 86 to extend to incline upward to the rear.

The respective left and right upper frames 26 extend backward substantially horizontally from connected portions to center portions of the front inclining sections 82 to be connected to tops of the rear inclining sections 87. The respective left and right upper frames 26 extend to nearly height of the head pipe 21 with rear portions behind connected portions to a rear portion inclining section 87 largely inclined upward to the rear.

The lower horizontal sections 85 on the left and the right and the left and right upper frames 26 surround the fuel tank 15 in cooperation with each other.

The frame 10 is a structure obtained by combining the high-pressure side structure 75 and the main structure 77. The frame 10 includes coupling structures 89 that couple the high-pressure side structure 75 and the main structure 77. The coupling structures 89 include flanges 91 on the high-pressure side structure 75 side, flanges 92 on the main structure 77 side, and bolts 93 functioning as tightening members that couple the flanges 91 and 92.

On the other hand, the low-pressure side structure 76 is a steel pipe bent in a frame shape of a U shape. The low-pressure side structure 76 is suspended between rear end portions of the upper frames 26. Open ends of the U shape of the low-pressure side structure 76 are respectively coupled to the left and right upper frames 26. The low-pressure side structure 76 extends obliquely upward to the rear from coupled portions thereof.

Figure 8:
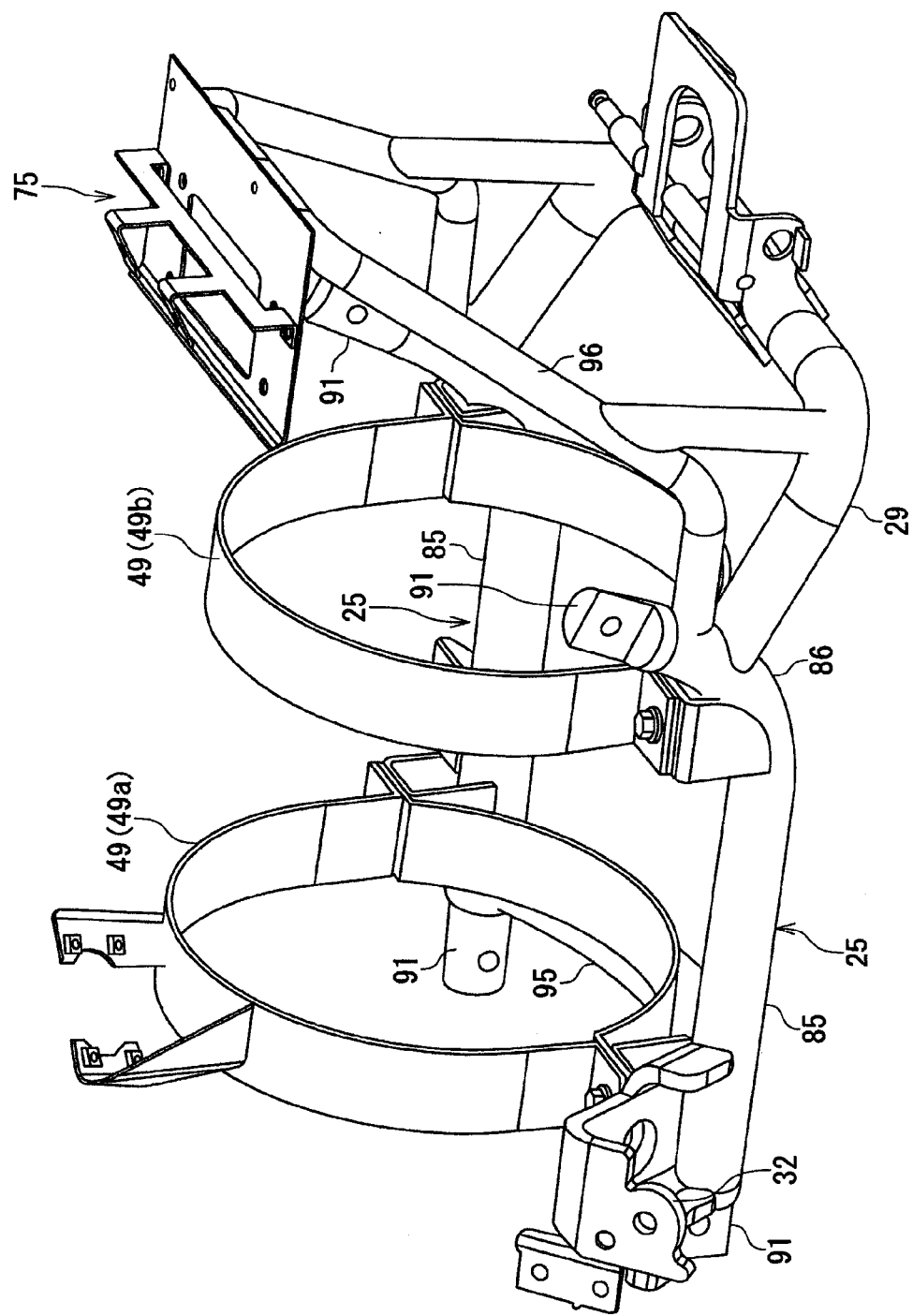
FIG. 8 is a perspective view showing a high-pressure side structure of the motorcycle according to the embodiment.

FIG. 8 is a perspective view showing the high-pressure side structure 75 of the motorcycle 1 according to the embodiment of the present invention.

As shown in FIG. 8, the high-pressure side structure 75 of the motorcycle 1 according to this embodiment includes the lower horizontal sections 85 and the rear curving sections 86 in the lower frames 25 and the guard frame 29. The high-pressure side structure 75 may include portions of the lower frames 25, which are portions under portions connected to the upper frames 26 in the front inclining sections 82 and portions under portions connected to the upper frames 26 in the front curving sections 83, the lower horizontal sections 85, the rear curving sections 86, and the rear inclining sections 87 and are integrally linked.

The high-pressure side structure 75 includes a bridge frame 95 suspended in front end portions of the left and right lower horizontal sections 85, the clamp band 49 suspended between the left and right lower horizontal sections 85 to fix the fuel tank 15, a pressure reducing valve column 96 suspended in a vicinity of upper end portions of the rear curving sections 86 on the left and the right to extend obliquely upward to the rear, and flanges 91 respectively located at the front end portions of the left and right lower horizontal sections 85 and the upper end portions of the left and right rear curving sections 86.

Portions of the left and right lower frames 25 included in the high-pressure side structure 75, the bridge frame 95, and the guard frame 29 form a well-curb shape and support the fuel tank 15 in cooperation with one another.

Figure 9:
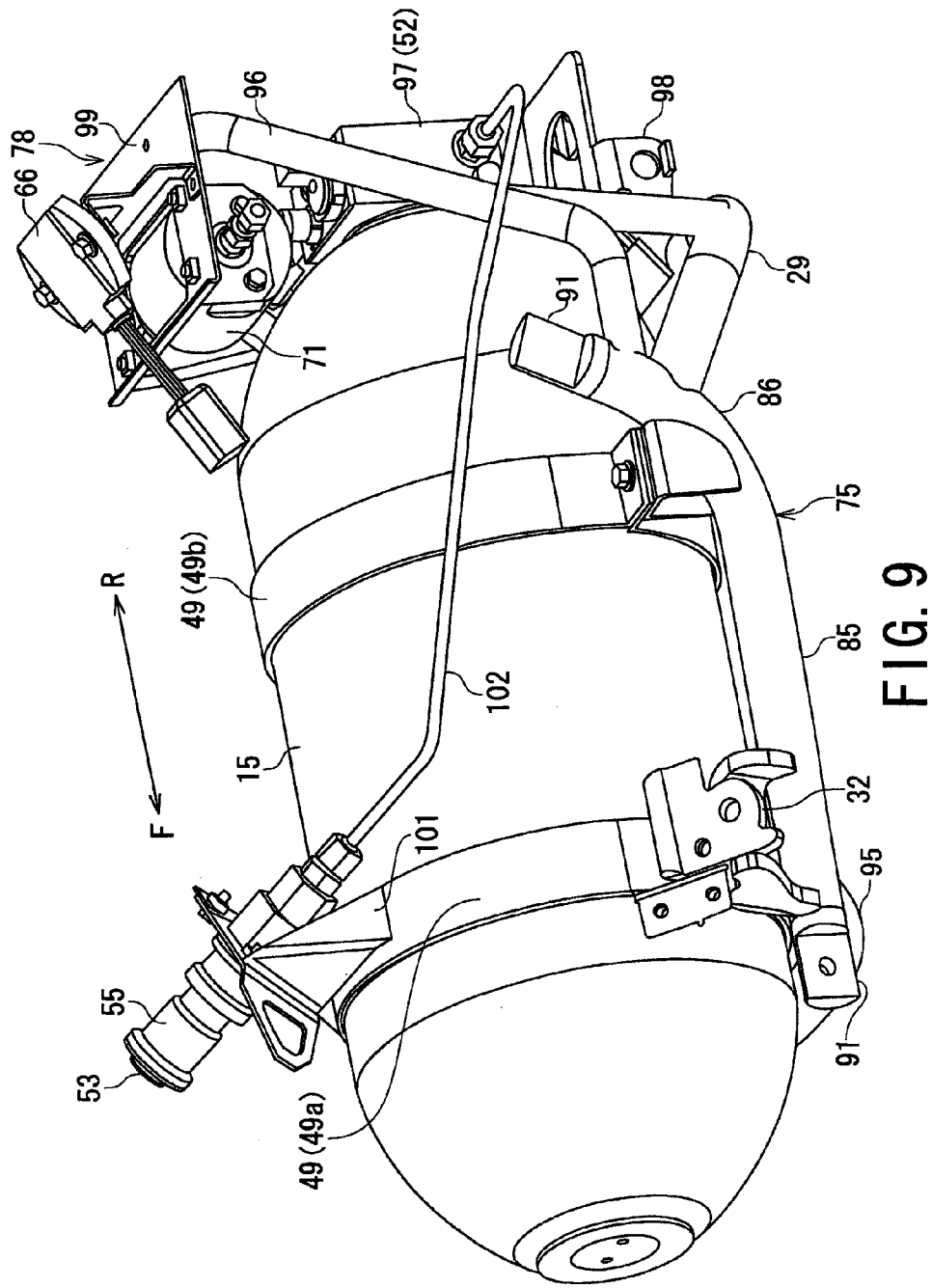
FIG. 9 is a perspective view showing a high-pressure side module of the motorcycle according to the embodiment of the present invention.
Figure 10:
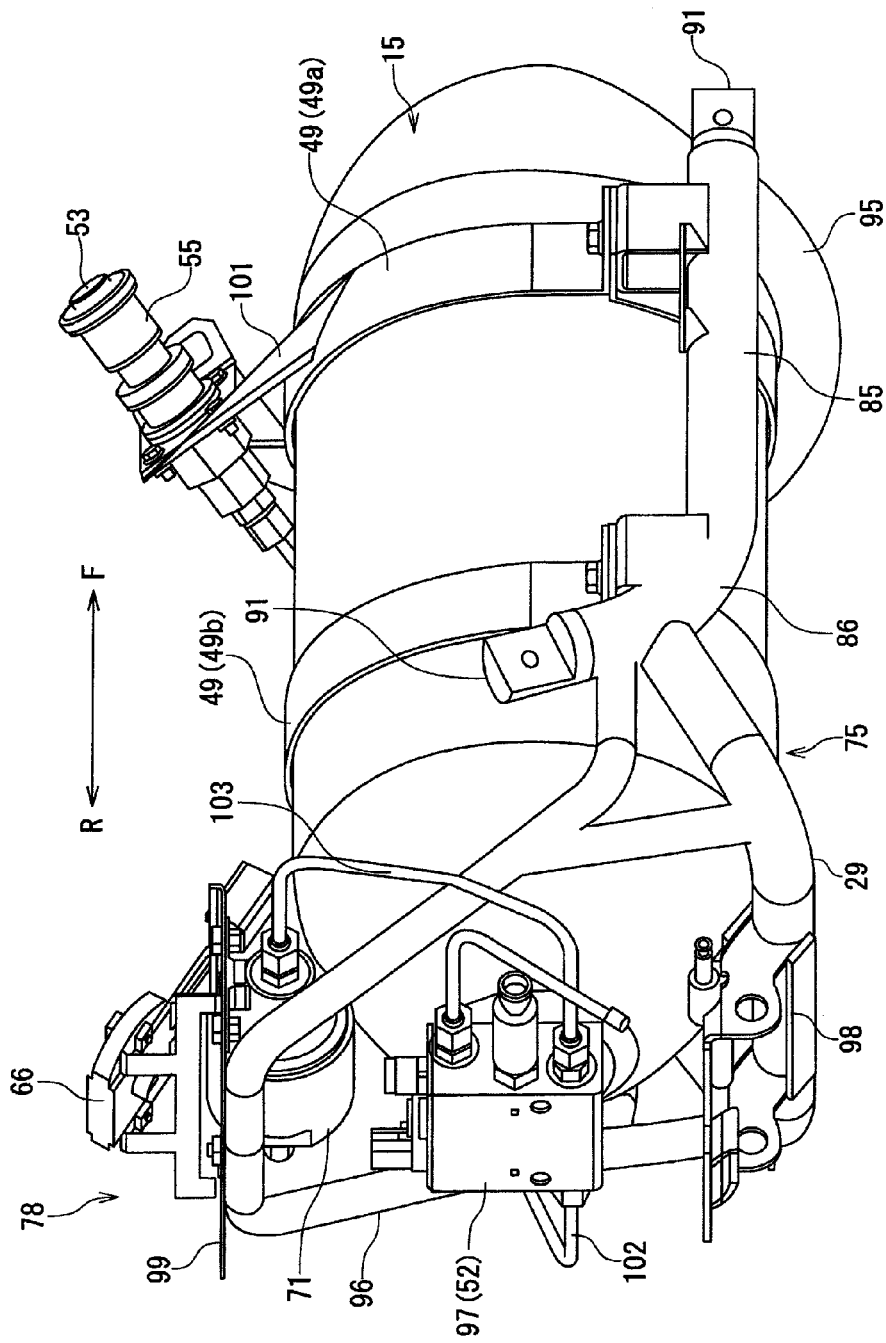
FIG. 10 is a perspective view showing the high-pressure side module of the motorcycle according to the embodiment.

FIGS. 9 and 10 are perspective views showing the high-pressure side module 78 of the motorcycle 1 according to the embodiment of the present invention.

FIG. 9 is a perspective view of the high-pressure side module 78 viewed from a left front side. FIG. 10 is a perspective view of the high-pressure side module 78 viewed from a right rear.

As shown in FIGS. 9 and 10, the high-pressure side structure 75 of the motorcycle 1 according to this embodiment holds the body section of the fuel tank 15 from left and right sides. The left and right lower horizontal sections 85 are arranged along lower edges of the body section of the fuel tank 15. The rear curving sections 86 are linked to rear ends of the lower horizontal sections 85 to hold a rear edge portion of the body section of the fuel tank 15 from the left and the right. The rear curving sections 86 extend to a position nearly a half of height in the up and down direction of the fuel tank 15 (i.e., nearly a radius of the body section).

The bridge frame 95 extends between the left and right lower horizontal sections 85 and is suspended thereto in an arcuate shape along a lower portion of a front edge portion of the body section of the fuel tank 15.

The guard frame 29 is connected to a halfway portion of the rear curving sections 86 on left and right sides of the rear edge portion of the body section of the fuel tank 15 to protect a lower portion of the rear end plate of the fuel tank 15. The guard frame 29 includes a center stand bracket 98 under a valve unit 97 located in the rear end plate of the fuel tank 15. The center stand bracket 98 supports the center stand 34 to swing.

The pressure reducing valve supporting column 96 includes, above the valve unit 97, a bracket 99 that fixes the first pressure reducing valve 71. The pressure reducing valve supporting column 96 extends to height where at least a portion of the first pressure reducing valve 71 is arranged between the left and right upper frames 26.

The clamp band 49 includes a front clamp band 49a that fixes a vicinity of a front edge or portion of the body section of the fuel tank 15 and a rear clamp band 49b that fixes a vicinity of a rear edge or portion of the body section of the fuel tank 15.

The valve unit 97 integrally includes the fuel supply main valve 52, a fuel filling main valve (not shown in the figures) hydraulically connected to the joint 55, and a safety valve (not shown in the figures).

The joint 55 is fixed to a stand 101 for joint located at a top of the front clamp band 49a and connected to a second relay pipe 102 for fuel filling that extends from the valve unit 97.

The first pressure reducing valve 71 is fixed to a lower surface side of the bracket 99 of the pressure reducing valve supporting column 96 and connected to a third relay pipe 103 for fuel supply that extends from the valve unit 97. The third relay pipe 103 bears a tank source pressure applied from the fuel tank 15 to the first pressure reducing valve 71.

The fuel leak detector 66 is fixed on an upper surface side of the bracket 99 of the pressure reducing valve supporting column 96.

The high-pressure side module 78 configured as explained above improves easiness of handling without applying a load to the second relay pipe 102 and the third relay pipe 103 while keeping, with the high-pressure side structure 75, a relative positional relation between a system for filling the fuel from the joint 55 to the fuel tank 15 and a system for leading the fuel from the fuel tank 15 to the first pressure reducing valve 71 in the fuel supply system 73.

Figure 11:
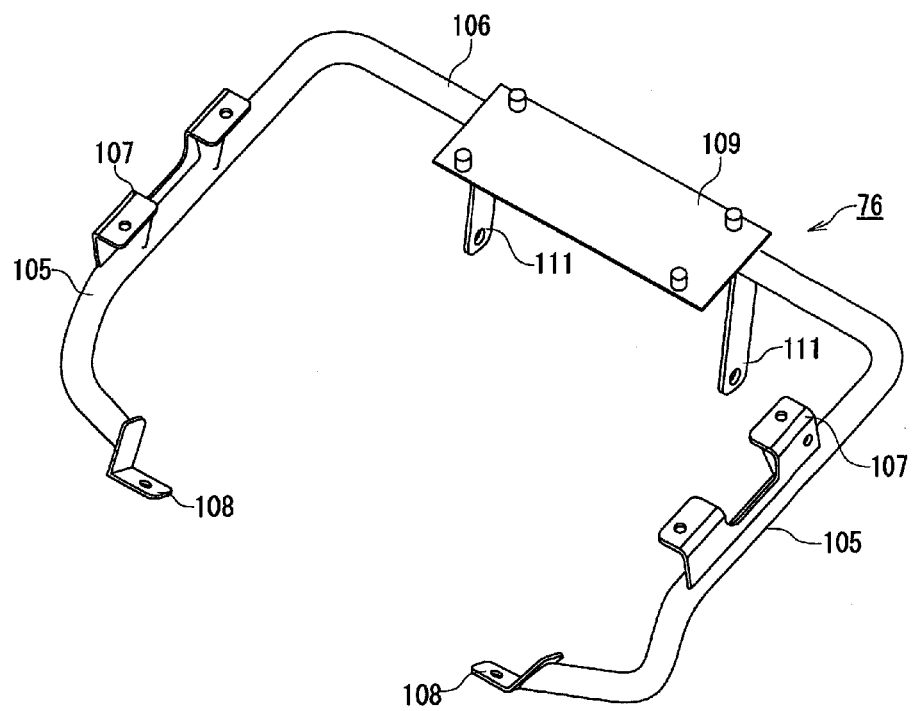
FIG. 11 is a perspective view showing a low-pressure side structure of the motorcycle according to the embodiment.

FIG. 11 is a perspective view showing the low-pressure side frame structure 76 of the motorcycle 1 according to the embodiment of the present invention.

Figure 12:
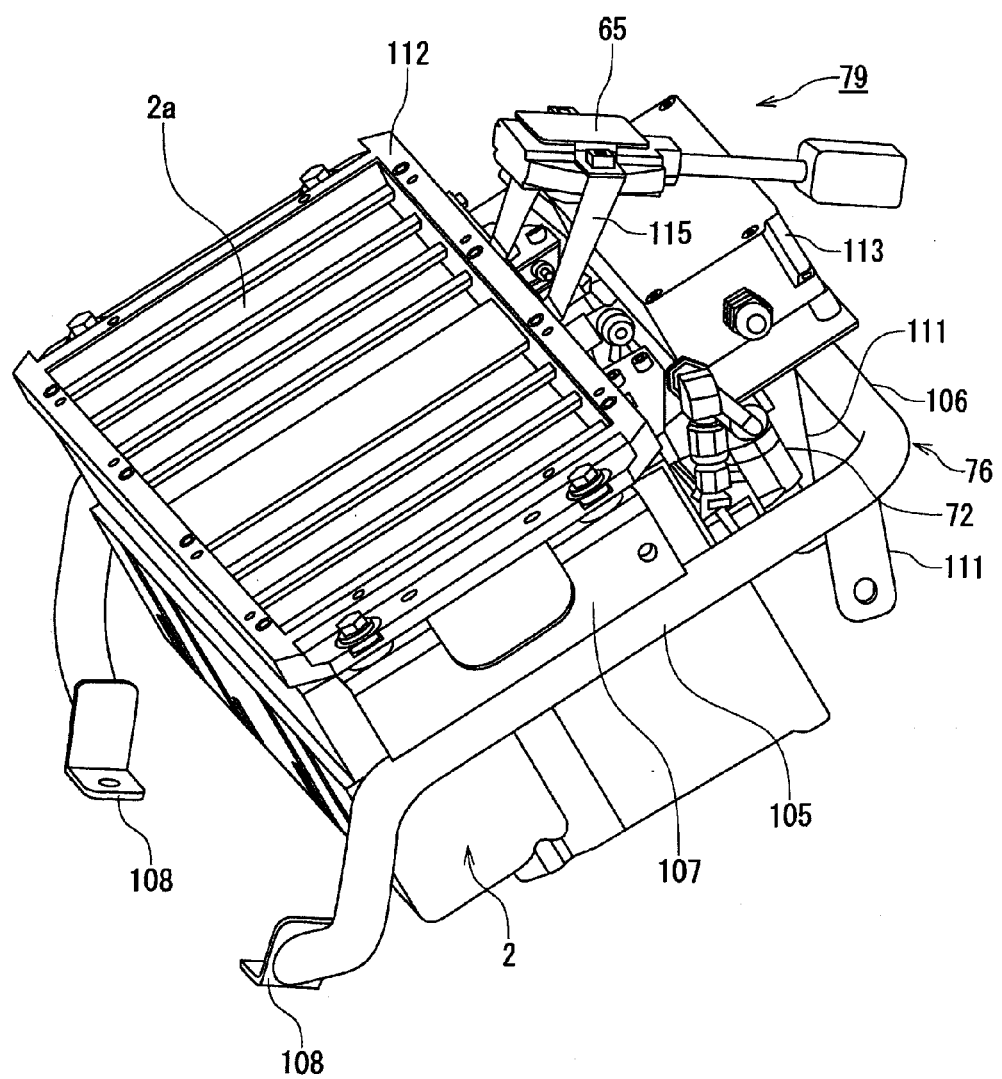
FIG. 12 is a perspective view showing a low-pressure side module of the motorcycle according to the embodiment.
Figure 13:
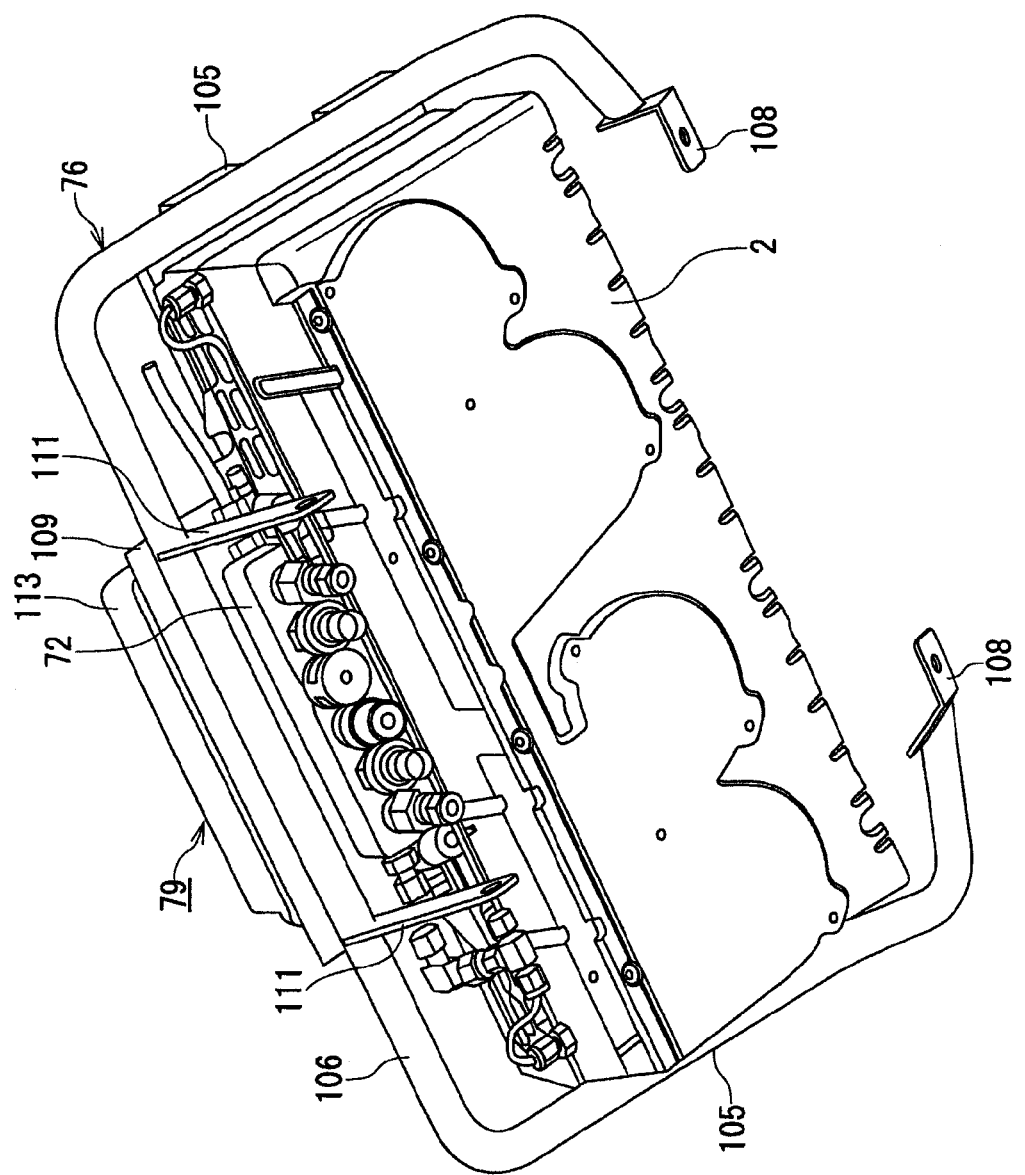
FIG. 13 is a perspective view showing the low-pressure side module of the motorcycle according to the embodiment.

FIGS. 12 and 13 are perspective views showing the low-pressure side module 79 of the motorcycle according to the embodiment of the present invention.

FIG. 12 is a perspective view of the low-pressure side module 79 viewed from the left front side. FIG. 13 is a perspective view of the low-pressure side module 79 viewed from the lower side.

As shown in FIGS. 11 to 13, the low-pressure side structure 76 of the motorcycle 1 includes a pair of left and right parallel sections 105 and a rear linear section 106 linked to rear ends of the parallel sections 105 and bent to an inner side direction of the motorcycle 1 to connect the left and right parallel sections 105. The low-pressure side structure 76 is formed in a frame shape of a U shape as a whole. The low-pressure side structure 76 includes the fuel cell unit 2 on an inner side of the U shape. In other words, the low-pressure side structure 76 extends to surround outer sides of left and right sides of the fuel cell unit 2.

The left and right parallel sections 105 include brackets 107 for fuel cell unit fixing that fix the fuel cell unit 2. Front end portions of the left and right parallel sections 105 include brackets 108 narrowed in a width direction of the fuel cell unit 2 to fix the low-pressure side module 79 to the frame 10.

The rear linear section 106 includes a bracket 109 for pressure reducing valve 72 having a tabular shape and brackets 111 that extend in a strip shape to the frame 10 and fix the low-pressure side module 79 to the frame 10.

The fuel cell unit 2 hangs with left and right edges of a top surface plate or frame 112, which includes the air intake surface 2a, caught by the brackets 107. An upper half portion of the fuel cell unit 2 is arranged above the parallel sections 105 and a lower half portion of the fuel cell unit 2 is arranged under the parallel sections 105.

The second pressure reducing valve 72 is fixed to a lower surface of the bracket 109. A control device 113 for controlling the second pressure reducing valve 72 is provided on an upper surface of the bracket 109 for pressure reducing valve 109.

The second pressure reducing valve 72 according to this embodiment is located on a rear side of the fuel cell unit 2. However, a bracket located on a front side may be separately provided. When the second pressure reducing valve 72 is located on the rear side of the fuel cell unit 2, even if a leak occurs in connected portions to the second pressure reducing valve 72 and the fuel cell unit 2, the hydrogen gas serving as the fuel is leaked to the rear of the equipment mounting region 36. Therefore, quick exhaust to the outside of the motorcycle 1 is expected. On the other hand, when the second pressure reducing valve 72 is located on the front side of the fuel cell unit 2, a distance between the second pressure reducing valve 72 and the first pressure reducing valve 71 is reduced. Therefore, length of the first relay pipe 81 is reduced.

The fuel leak detector 65 is supported by brackets 115 for fuel leak detector fixed to the fuel cell unit 2 and located above the fuel cell unit 2.

In the low-pressure side module 79 configured as explained above, easiness of handling is improved while a relative positional relation of a system for leading the fuel from the second pressure reducing valve 72 to the fuel cell unit 2 in the fuel supply system 73 is fixed by the low-pressure side structure 76.

Figure 14:
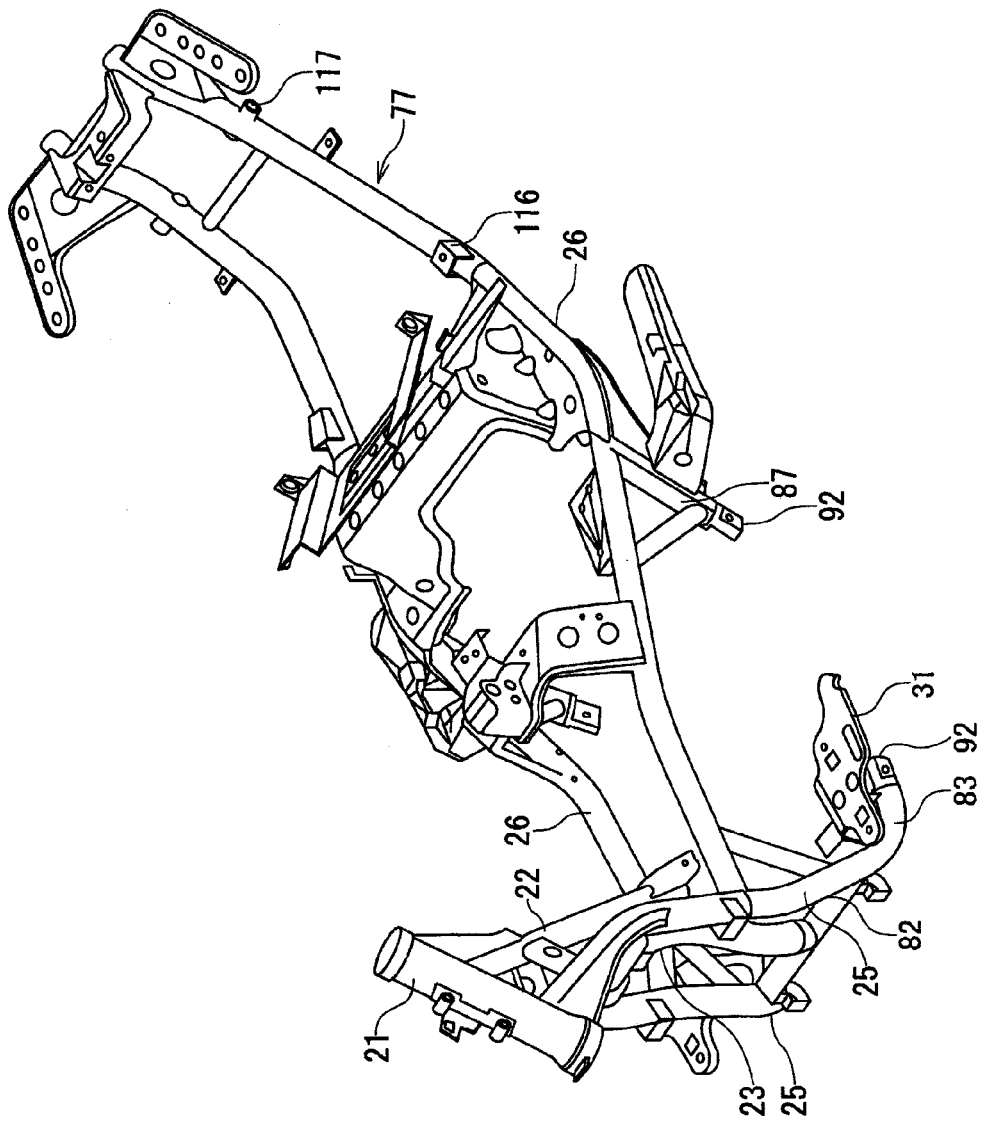
FIG. 14 is a perspective view showing a main structure of the motorcycle according to the embodiment of the present invention.

FIG. 14 is a perspective view showing the main structure 77 of the motorcycle 1 according to the embodiment of the present invention.

As shown in FIG. 14, the main structure 77 of the motorcycle 1 according to this embodiment includes the upper frames 26 and the front inclining sections 82, the front curving sections 83, and the rear inclining sections 87 in the lower frame 25, which are remaining sections, which remain after removing the lower frames 25 from the frame 10. The main structure 77 includes remaining sections, which remain after removing the high-pressure side structure 75 from the frame 10, according to a forming range of the high-pressure side structure 75.

The main structure 77 includes flanges 92 respectively located at rear end portions of the front curving sections 83 on the left and the right and lower end portions of the rear inclining sections 87 on the left and the right.

Further, the main structure 77 includes brackets 116 and 117 that fix the brackets 108 and 111 of the low-pressure side structure 76. The brackets 117 on the main structure 77 side fasten the brackets 111 of the low-pressure side structure 76 together with the rear suspension 61 that buffers the swing of the swing arm 9.

In the motorcycle 1 configured as explained above, in a leak inspection for the fuel supply system 73, first, the high-pressure side module 78 and the low-pressure side module 79 are inspected separately from each other. After the inspection, the respective modules 78 and 79 are mounted on the frame 10. Thereafter, the first pressure reducing valve 71 and the second pressure reducing valve 72 are connected by the first relay pipe 81. A connected place of the first relay pipe 81 is inspected to carry out the leak inspection for the entire fuel supply system 73.

In the high-pressure side module 78, since the fuel tank 15 having high withstanding pressure performance is adopted to fill the fuel (the hydrogen gas) in the fuel tank 15 in as large an amount as possible, pressure during the leak inspection is high. On the other hand, in the low-pressure side module 79, since the fuel having pressure lower than 1 MPa, specifically, pressure of about 0.4 MPa at normal temperature is fed into the fuel cell unit 2, pressure during the leak inspection is extremely low compared with the pressure in the high-pressure side module 78.

Therefore, the motorcycle 1 according to this embodiment is configured to divide the high-pressure side module 78 and the low-pressure side module 79 according to pressure on a primary side of the first pressure reducing valve 71 and a secondary side of the second pressure reducing valve 72 to perform the leak inspection separately for the high-pressure side module 78 and the low-pressure side module 79.

In the motorcycle 1 according to this embodiment, the fuel tank 15, the joint 55, and the first pressure reducing valve 71, through which the high-pressure fuel circulates, are firmly held. Therefore, a risk of occurrence of a leak concerned in the pipe-connection-first procedure in the past is avoided without damaging the second relay pipe 102 and third relay pipe 103.

In the motorcycle 1 according to this embodiment, the second pressure reducing valve 72 and the fuel cell unit 2, through which the fuel circulates, are firmly held by the low-pressure side structure 76. Therefore, the risk of occurrence of a leak concerned in the pipe-connection-first procedure in the past is avoided without damaging the connected portions of the devices.

In the motorcycle 1 according to this embodiment, without handling of the entire fuel supply system 73, the leak inspection is carried out for only portions through which the high-pressure fuel circulates. Weight of an inspection target in the leak inspection is reduced and easiness of handling is improved.

In the motorcycle 1 according to this embodiment, without handling of the entire fuel supply system 73, the leak inspection is carried out for only portions through which the low-pressure fuel circulates. Weight of an inspection target in the leak inspection is reduced and easiness of handling is improved.

In the motorcycle 1 according to this embodiment, the leak inspection is carried out in a state in which the high-pressure side module 78 is removed from the main structure 77. Therefore, the main structure 77 does not spoil workability of the leak inspection. Reliability of the inspection is improved.

In the motorcycle 1 according to this embodiment, the leak inspection is carried out in a state in which the low-pressure side module 79 is removed from the main structure 77. Therefore, the main structure 77 does not spoil workability of the leak inspection. Reliability of the inspection is improved.

The motorcycle 1 according to this embodiment is suitable for a line production system because of the improvement of the easiness of handling and the workability of the inspection.

In the motorcycle 1 according to this embodiment, the fuel tank 15 is surrounded by the upper frames 26 and the lower frames 25. Therefore, the fuel tank 15 is surely and solidly protected from accidents such as overturning and collision of the motorcycle 1.

Further, in the motorcycle 1 according to this embodiment, at least a portion of the first pressure reducing valve 71 is arranged between the left and right upper frames 26. Therefore, the first pressure reducing valve 71 to which a high pressure is applied is surely protected even if the motorcycle 1 overturns.

Therefore, with the motorcycle 1 according to the embodiment of the present invention, the series of devices (the fuel supply system 73) for leading the fuel from the fuel tank 15 to the fuel cell unit 2 are easily assembled, workability of a leak inspection for a channel that hydraulically connects the devices is high, and handling in assembly work and the inspection is easy.

What is claimed is:
1. A motorcycle, comprising:
a fuel tank that stores fuel;
a fuel filling joint hydraulically connected to the fuel tank;
a first pressure reducing valve hydraulically connected to the fuel tank to reduce pressure of the fuel to first pressure;
a second pressure reducing valve hydraulically connected to the first pressure reducing valve to reduce the pressure of the fuel to second pressure;
a fuel cell unit hydraulically connected to the second pressure reducing valve to generate electric power via reaction of the fuel and an oxidizing agent;

a high-pressure side structure that supports the fuel tank, the joint, and the first pressure reducing valve while keeping relative arrangement thereof;

a low-pressure side structure that supports the second pressure reducing valve and the fuel cell unit while keeping relative arrangement thereof; and a main structure that detachably fixes the high-pressure side structure and the low-pressure side structure.

2. The motorcycle of claim 1, further comprising a detachable relay pipe that hydraulically connects the first pressure reducing valve and the second pressure reducing valve.

3. The motorcycle of claim 1, wherein the high-pressure side structure and the main structure include a head pipe, a pair of left and right lower frames, and a pair of left and right upper frames, the pair of left and right lower frames each including a front inclining section that extends to incline downward to a rear from a connected portion to the head pipe, a front curving section linked to a lower end of the front inclining section to bend backward, a lower horizontal section linked to a rear end of the front curving section to extend backward substantially horizontally, a rear curving section linked to a rear end of the lower horizontal section to curve obliquely upward to the rear, and a rear inclining section linked to an upper end of the rear curving section to extend to incline upward to the rear, and the pair of left and right upper frames each extending backward substantially horizontally from a connected portion to a center portion of the front inclining section to be connected to the rear inclining section and further extending backward, the lower horizontal sections on left and right and the left and right upper frames surround the fuel tank in cooperation with each other, and the high-pressure side structure includes a portion of the lower frame, which is a portion under a portion connected to the upper frame in the front inclining section and portions under portions connected to the upper frame in the front curving section, the lower horizontal section, the rear curving section, and the rear inclining section, and the main structure includes remaining sections of the lower frame and the upper frame.

4. The motorcycle of claim 3, wherein the high-pressure side structure includes a pressure reducing valve supporting column that arranges at least a portion of the first pressure reducing valve between the left and right upper frames.

5. The motorcycle of claim 1, wherein the main structure includes a head pipe, a front inclining section that extends to incline downward to a rear from a connected portion to the head pipe, and a pair of left and right upper frames that extend substantially horizontally in a front-rear direction from a connected portion to a center portion of the front inclining section, and the low-pressure side structure is suspended between the rear end portions of the upper frames.

6. The motorcycle of claim 5, wherein the fuel cell unit has a width dimension larger than a separation distance between the left and right upper frames, and the low-pressure side structure extends to surround outer sides on left and right sides of the fuel cell unit.

7. The motorcycle of claim 1, wherein the second pressure reducing valve is located on a front side or a rear side of the fuel cell unit.

* * * * *